United States Patent [19]

Dhein et al.

[11] Patent Number: 5,308,489
[45] Date of Patent: May 3, 1994

[54] BLENDS OF POLYETHER COPOLYCARBONATES AND HIGH MOLECULAR WEIGHT FILM-FORMING THERMOPLASTICS

[75] Inventors: Rolf Dhein; Wolfgang Ebert, both of Krefeld; Herbert Hugl, Bergisch Gladbach; Holger Ohst, Odenthal-Steinhaus, all of Fed. Rep. of Germany

[73] Assignee: Bayer Aktiengesellschaft, Leverkusen, Fed. Rep. of Germany

[21] Appl. No.: 989,143

[22] Filed: Dec. 11, 1992

[30] Foreign Application Priority Data

Dec. 23, 1991 [DE] Fed. Rep. of Germany ....... 4142765

[51] Int. Cl.⁵ .................. B01D 71/50; C08L 69/00
[52] U.S. Cl. ..................... 210/500.4; 210/500.28; 210/500.38; 525/92; 525/133; 525/146; 525/148; 525/409; 525/433; 525/462; 525/469
[58] Field of Search .......... 525/92, 146, 148, 409, 525/433, 462, 469, 133; 210/500.4

[56] References Cited

U.S. PATENT DOCUMENTS

| | | | |
|---|---|---|---|
| 4,069,151 | 1/1978 | Higley et al. | 210/500 M |
| 4,563,516 | 1/1986 | Schreckenberg | 525/469 |
| 4,663,399 | 5/1987 | Peters | 525/469 |
| 4,935,140 | 6/1990 | Konstatin | 210/500.4 |
| 5,104,723 | 4/1992 | Freitag | 525/469 |

FOREIGN PATENT DOCUMENTS 0213465 3/1987 European Pat. Off. .

OTHER PUBLICATIONS

Spatorico, J. of App. Polym. Sci. vol. 18, pp. 1793-1804 (1974).
Journal of Membrane Science, 34 (1987) 185-198.
O.G. Abstract of U.S. Pat. No. 4,252,922.

*Primary Examiner*—David Buttner
*Attorney, Agent, or Firm*—Connolly & Hutz

[57] ABSTRACT

The invention relates to blends of polyether copolycarbonates and other thermoplastics, to their production and to their use for the production of membranes, more particularly for dialysis.

5 Claims, No Drawings

BLENDS OF POLYETHER COPOLYCARBONATES AND HIGH MOLECULAR WEIGHT FILM-FORMING THERMOPLASTICS

This invention relates to blends of polyether copolycarbonates and other high molecular weight thermoplastics, to a process for their production and to their use. The blends according to the invention are particularly suitable for the production of membranes for dialysis, hemofiltration, ultrafiltration and reverse osmosis, for the production or coating of plastic moldings, films, fibers, and nonwovens.

Segmented aliphatic-aromatic polyether copolycarbonates are known (see, for example, DE-OS 1 251 966, U.S. Pat. No. 4,160,791, U.S. Pat. No. 4,075,108, U.S. Pat. No. 4,069,151).

They may be produced either in homogeneous phase by the so-called pyridine process (for example U.S. Pat. No. 4,160,791) or by the interfacial process from diphenols, polyether diphenol carbonates and phosgene (DE-OS 3 408 804).

Polyether copolycarbonates produced by this process are particularly suitable for the production of membranes for hemodialysis, hemofiltration, ultrafiltration and reverse osmosis (R. E. Kesting, Synthetic Polymeric Membranes, page 146).

In order to obtain an optimal relationship between mechanical strength, ultrafiltration rate and permeability to urine-borne substances, the polyether copolycarbonate has to be synthesized with an exact percentage content of hard and soft segments. Where membranes varying in their performance data are needed, as is necessary for a range of dialysis membranes, a completely new polymer has to be synthesized. This is both difficult and uneconomical on an industrial scale.

Accordingly, the problem addressed by the present invention was to provide an industrially practicable and economic solution for the production of membranes adjustable as required in regard to their performance spectrum.

This problem has been solved by blends of polyether copolycarbonates and high molecular weight film-forming thermoplastics.

Membranes having a selectively graduated property spectrum can be produced from a master batch of a polyether/polycarbonate block copolymer having a high percentage content of polyether by blending with polycarbonate.

Accordingly, the present invention relates to blends of a) 5% by weight to 95% by weight of a segmented aliphatic-aromatic polyether copolycarbonate corresponding to general formula (I)

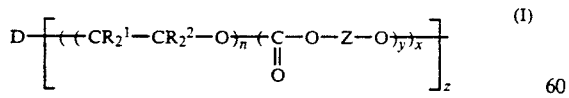

in which
R$^1$ and R$^2$ independently of one another represent H or C$_{1-5}$ alkyl or form a cycloaliphatic ring containing 5 to 6 ring members,
z = 2 to 4, preferably 2 or 3,
n, x, y are selected so that the total molecular weight Mw is on average in the range from 10,000 to 350,000 and preferably in the range from 20,000 to 120,000, D is the deprotonated residue of a dihydric to tetrahydric C$_{2-18}$ alcohol optionally containing aromatic constituents, n is selected so that the molecular weight Mw (as determined in known manner) of the optionally branched polyether block is in the range from 2,000 to 25,000 and preferably in the range from 4,000 to 20,000 depending on the constituents R$^1$ and R$^2$, Z is a diphenol residue corresponding to general formula (II)

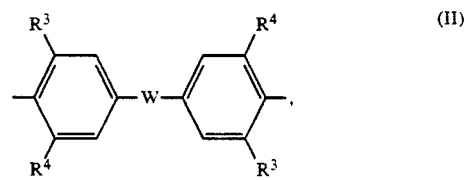

where
R$^3$ and R$^4$ independently of one another represent H, C$_{1-5}$ alkyl, O—C$_{1-5}$-alkyl or halogen, preferably H or methyl, and
W is a single chemical bond,

O, SO$_2$ or SO,
R$^5$ and R$^6$ independently of one another being hydrogen, C$_{1-18}$ alkyl, phenyl, C$_{7-19}$ alkaryl/aralkyl, in addition to which the substituents R$^5$ and R$^6$ may be closed to form a cycloalkyl group containing 4 to 18 ring members and preferably 5 to 6 ring members, or a group corresponding to the following formulae

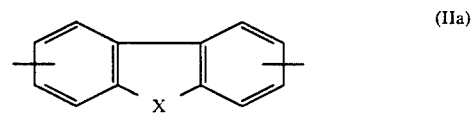

where
X = O, S, SO$_2$,

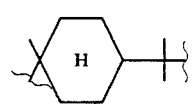

or

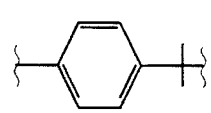

the polyether copolycarbonate (I) having a weight average molecular weight Mw in the range from 10,000 to 350,000 and preferably in the range from 20,000 to 120,000 (as determined by the light scattering method using a scattered light photometer) and a content of 10% by weight to 75% by weight aromatic carbonate structural units

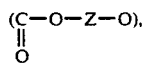

and b) 95% by weight to 5% by weight of another film-forming thermoplastic or a mixture of other film-forming thermoplastics, preferably another amorphous film-forming thermoplastic or a mixture of other amorphous film-forming thermoplastics, the total polyether content of the blends resulting from components a) being $\geq 18\%$ by weight and preferably $>25\%$ by weight.

Blends of 80 to 98% polycarbonates and 20 to 2% polyether carbonates which have a polyether content of 50 to 70% by weight are known from U.S. Pat. No. 4,252,922. The maximum possible polyether content is thus 14% by weight, based on the mixture as a whole. However, blends such as these have the disadvantage that they do not form efficient dialysis membranes.

The present invention also relates to a process for the production of the blends of components a) and b), characterized in that components a) and b) are mixed under moderate conditions in powder form, in the form of granules or in the form of solutions and the resulting mixture is isolated as a solid, optionally after evaporation of the solvent, crystallization, precipitation or spray drying or optionally via the melt.

Moderate conditions are conditions in which the mixtures are not exposed to temperatures above $+200°$ C.

Diphenols HO—Z—OH may be, for example, hydroquinone, resorcinol, dihydroxydiphenols, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenol)-sulfoxides, $\alpha,\alpha'$-bis-(hydroxy-phenyl)-diisopropylbenzenes and nucleus-alkylated and nucleus-halogenaed compounds thereof.

Preferred diphenols are, for example, 4,4'-dihydroxydiphenyl, 2,2-bis-(4-hydroxyphenyl)-propane, 2,4-bis-(4-hydroxyphenyl)-2-methyl butane, 1,1-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methyl butane, 1,1-bis-(3,5-dimethyl-4-hydroxyphenyl)-p-diisopropylbenzene, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane, bis-(4-hydroxyphenyl)-sulfone, bis-(4-hydroxyphenyl)-sulfide.

Particularly preferred diphenols are, for example, 2,2-bis-(4-hydroxyphenyl)-propane, 2,2-bis-(3,5-dimethyl-4-hydroxyphenyl)-propane, 1,1-bis-(4-hydroxyphenyl)-cyclohexane, bis-(4-hydroxyphenyl)-sulfone and bis-(4-hydroxyphenyl)-sulfide.

The diphenols may be used both individually and in admixture with one another; accordingly, both homopolycarbonates and copolycarbonates are included. The diphenols are known from the literature or may be produced by methods known from the literature.

Small quantities, preferably of 0.05 to 2.0 mol-%, based on mols of diphenols used, of trifunctional or more than trifunctional compounds, more particularly those containing three or more than three phenolic hydroxyl groups, may also be used. Some of the compounds containing three or more than three phenolic hydroxyl groups which may be used in accordance with the invention are, for example, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphen-yl)-phenyl methane, 2,2-bis-[4,4-bis-(4-hydroxyphenyl)-cyclohexyl]-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(3,4-dihydroxyphenyl)-propane, hexa-(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-(4',4''-dihydroxytriphenyl)-methylbenzene.

Other possible branching agents are 2,4-dihydroxybenzoic acid, trimesic acid or trimesic acid trichloride, cyanuric chloride and 3,3-bis-(3-methyl-4-hydroxyphenyl)-2-oxo-2,3-dihydroindole.

The 0.05 to 2 mol-%, based on diphenols used, of branching agents optionally used in accordance with the invention may either be initially introduced with the diphenols themselves and the molecular weight regulators in the aqueous alkaline phase or may be added in solution in an organic solvent before or during the phosgenation reaction.

Suitable molecular weight regulators are monocarboxylic acid chlorides or monophenols, preferably monophenols, such as for example phenol, 4-alkylphenols, such as p-tert. butylphenol, p-i-octylphenol, p-nonylphenol, p-dodecylphenol.

Polyether blocks of which 25 to 90% by weight are cocondensed with the aromatic block copolycarbonates according to the invention are those based on diphenols in turn based on alcohols containing aliphatically bound hydroxyl groups. Polyethers such as these may contain polyethers with 3 to 6 and preferably 3 to 4 hydroxyl groups as branching agents.

Diols suitable for these polyethers are, for example, ethylene glycol, propane-1,2-diol, butane-1,2-diol, cyclopentane-1,2-diol, cyclohexane-1,2-diol or the corresponding epoxides.

Preferred polyether units are ethylene glycol and propane-1,2-diol. The polyethers used may be based on more than one diol unit. In this case, the polyethers preferably have a segmented structure. In addition, the polyethers may be provided with branching agents and may thus have a star-like structure which, again, may be segmented.

Polyols which may be used as branching agents are, for example, glycerol, trimethylol propane, trimethylol ethane, sorbitol, pentaerythritol or hexanediols.

The polyether copolycarbonates may be synthesized by the processes described for the purely aromatic polycarbonate, although condensation in a kneader instead of a tank reactor is preferred. Molecular weight may be regulated with the same branching agents and/or chain terminators normally used for aromatic polycarbonates.

More specifically, therefore, polyether copolycarbonates may be alternatively produced as follows:
a) by the interfacial process from bisphenol(s) and hydroxyl-terminated polyethers,
b) by transesterification of diphenyl carbonate with bisphenol(s) and hydroxyl-terminated polyethers, c) by preparation of a precondensate of bisphenol(s) and hydroxyl-terminated polyethers by the melt transesterification process or the interfacial process and subsequent condensation by known methods, d) by preparation of a precondensate of polycarbonate and polyethers by transesterification in the melt or preferably in solution in the presence of acidic or alkaline catalysts, preferably alkaline catalysts, and condensation of the prepolymers by the melt transesterification or interfacial method, e) by compounding of the precondensates with high molecular weight polycarbonate.

As already mentioned, the polyether copolycarbonates thus obtained are mixed in known manner with high molecular weight, film-forming and preferably amorphous thermoplastics from solution or the melt; either from the solid polymers in an extruder or from the solutions via an evaporation extruder or from solutions of both polymers by precipitation, crystallization, evaporation of the solvent, gelation or spray evaporation, optionally with incorporation of auxiliaries, such as alcohols or hydrocarbons, or auxiliary gases, such as air, nitrogen or $CO_2$; $CO_2$ may even be incorporated under pressure in liquid form.

Depending on the particular application envisaged, the blends obtained in this way may be provided with the stabilizers typically used for polyethers or polycarbonates, such as UV stabilizers, heat stabilizers, and also processing aids, such as mold release agents or lubricants. Fillers and nucleating agents, such as mineral powders, glass beads, glass fibers, etc., may also be added in known manner.

Suitable blend partners are any compatible film-forming thermoplastics which should preferably be amorphous.

These may be, for example, aromatic polycarbonates, polyester carbonates, polyesters, polysulfones, polyether sulfones, polyether ketones, polyamides, polyimides, polyamidoimides, polyaramides, polyurethanes, polyvinyl chloride, polyacrylonitrile, polyacrylates, polyhydantoins and typical copolymers thereof, as known to the expert.

Preferred blend partners are optionally branched polycarbonates of the type described in connection with block copolycarbonates for the aromatic polycarbonate segment, polyether sulfones and polyether ether ketones. However, particularly suitable blend partners are the polycarbonates which, as bisphenolic units, contain dihydroxyphenyl cycloalkanes corresponding to formula (IV)

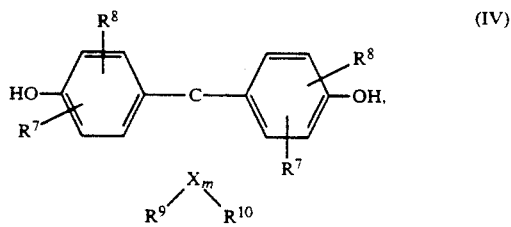

in which $R^7$ and $R^8$ independently of one another represent hydrogen, halogen, preferably chlorine or bromine, $C_{1-8}$ alkyl, $C_{5-6}$ cycloalkyl, $C_{6-10}$ aryl, preferably phenyl, and $C_{7-12}$ aralkyl, preferably phenyl-$C_{1-4}$-alkyl, more particularly benzyl and cumyl, m is an integer of 4 to 7 and preferably 4 or 5, $R^9$ and $R^{10}$ may be individually selected for each X and, independently of one another, represent hydrogen or $C_{1-6}$ alkyl and X is carbon, with the proviso that, at at least one atom X, both $R^9$ and $R^{10}$ are alkyl, optionally in addition to other bisphenols.

$R^9$ and $R^{10}$ are both alkyl preferably at 1 to 2 atoms X and, more preferably, at only one atom X. The preferred alkyl radical is methyl. The X atoms in the α-position to the diphenyl-substituted C atom (C-1) are preferably not dialkyl-substituted, whereas the X atoms in the β-position to C-1 are preferably dialkyl-substituted.

Dihydroxydiphenyl cycloalkanes containing 5 and 6 ring C atoms in the cycloaliphatic component (m=4 or 5 in formula (IV)), such as for example diphenols corresponding to the following formulae

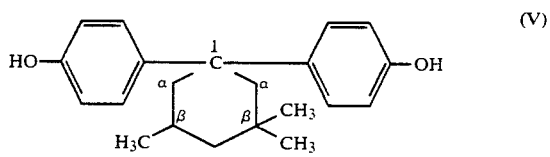

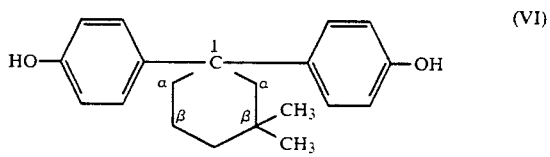

and

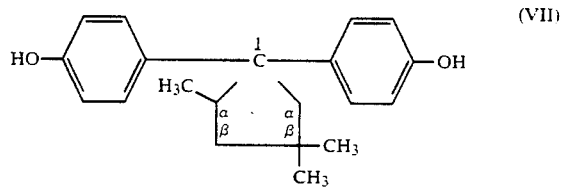

are particularly preferred as starting material, 1,1-bis-(4-hydroxyphenyl)-3,3,5-trimethyl cyclohexane being most particularly preferred.

However, optionally branched polycarbonates based on bisphenol A are also preferred.

Of the polyamides, transparent substantially amorphous types are preferred. Polyamides such as these contain, for example, lauric lactam, dimer fatty acid, iso/terephthalic acid or even components which disturb crystallization, optionally in addition to the usual components, such as ε-caprolactam, adipic acid, hexamethylenediamine.

Other preferred blend partners are polyhydantoijns corresponding to general formula (VIII)

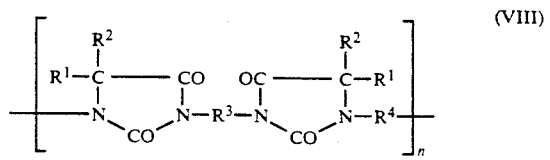

in which $R^1$ and $R^2$ independently of one another represent $C_{1-8}$ alkyl and $R^3$ and $R^4$ independently of one another represent $C_{2-8}$ alkylene, $C_{6-12}$ arylene, $-C_6H_4-CH_2-C_6H_4-$, $-C_6H_4-(CH_3)_2-DC_6H_4-$, $-C_6H_4-O-C_6H_4-$ or $-C_6H_4-SO_2-C_6H_4$.

$C_{1-8}$ alkyl is, for example, methyl, ethyl, propyl, butyl, hexyl or octyl and branched isomers thereof; $C_{2-8}$ alkylene is, for example, ethylene, propylene, butylene, hexylene or octylene and branched isomers thereof. $C_{6-12}$ arylene is, for example, phenylene, biphenylene or naphthylene, preferably phenylene. At least one of the substituents $R^3$ and $R^4$ is preferably arylene.

The values for the index n may vary within wide limits and are between 2 and 200 and preferably between 2 and 150.

The diphenyl methane polyhydantoin corresponding to the following formula is mentioned by way of example:

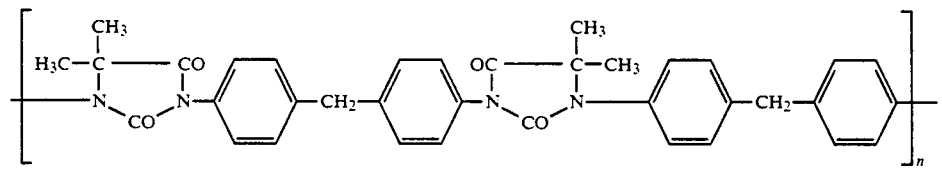

Other preferred blend partners are polyacrylonitriles and copolymers thereof with other optionally substituted alkenes or dienes, for example of the type described in DE-OS 3 922 495.

In another embodiment of the process according to the invention, more than one thermoplastic is added to the polyether/polycarbonate block copolymer. Additional hydrophilic blend partners, such as polyvinyl pyrrolidone, polyacrylic acids and typical copolymers thereof, may also be mixed with the blends according to the invention.

The blends according to the invention may be processed in known manner to various types of moldings, more particularly to membranes.

Accordingly, the present invention also relates to the use of the blends according to the invention for the production of membranes.

The present invention also relates to membranes produced from the blends of components a) and b) according to the invention.

The present invention also relates to the use of the membranes according to the invention for dialysis.

Method for Determining Membrane Performance

The ultrafiltration rate of the membranes is determined by measurement of the liquid volume which passes through the membrane over an area thereof determined by the apparatus at a temperature of 37° C. and for a given pressure difference and which, for general comparability, is standardized to area unit, time unit and pressure unit. Water is used as the liquid for determining the ultrafiltration rate. The method is described inter alia in "Evaluation of Hemodialyzers and Dialysis Membranes" of the U.S. Department of Health, Education and Welfare, DHEW Publication No. (NIH) 778-1294, pages 24-26.

Sodium chloride is used as the test substance for the uremia toxins. The diffuse pressureless change in concentration between two differently concentrated starting solutions on either side of the membrane is measured as a function of time using a Kaufmann-Leonhard cell. The Cl concentration in both cells may readily be determined by conductivity measurements.

EXAMPLE 1

A polycarbonate block copolymer corresponding to the following formula

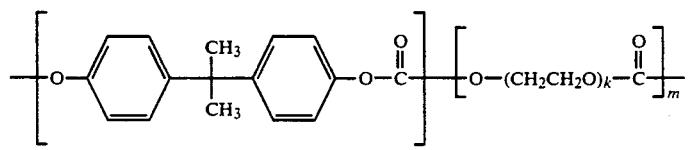

containing 50% by weight of a polyglycol ether, Mn 8000, is prepared by the method described in DE-OS 2 408 804. The relative viscosity $\eta_{rel}$, as measured on a 0.5% solution of the polymer in $CH_2Cl_2$ at 20° C., is 1.79 (Ubbelohde viscosimeter).

To produce a blend, 7.0 g of this block copolymer obtained with 9.0 g of a high molecular weight bisphenol A polycarbonate having a relative viscosity $\eta_{rel}$ of 2.4, as measured on a 0.5% solution of the polymer in $CH_2Cl_2$ at 20° C., are dissolved in 84 g N-methyl pyrrolidone by stirring for 3 hours at 80° C.

EXAMPLE 2

The solution of Example 1 is cooled to 25° C., filtered through a Seitz Supra 100 filter layer and subsequently degassed.

To produce a dialysis membrane, this casting solution is knife-coated onto a glass plate to form a 60 μm thick film. The coated glass plate is then slowly introduced vertically into a precipitation bath containing $H_2O$ at 25° C. as precipitant. After approx. 15 mins., the membrane separates from the glass and is subsequently tested for ultrafiltration rate and dialytic chloride permeability.

The results are as follows:
UF value [ml/h×m²×mbar]: 19.7
Cl permeability [cm/s×10⁻⁴]: 5.2

EXAMPLE 3

12 g of the polycarbonate block polymer described in Example 1 containing 50% by weight of a polyglycol ether, $M_n$ 8000, are dissolved with 24 g of an aromatic polycondensate corresponding to the following formula

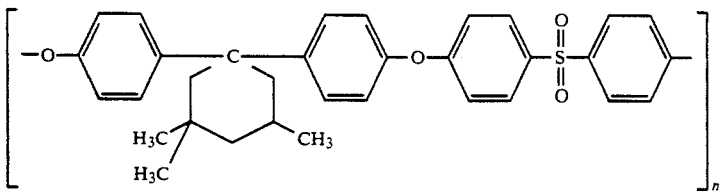

in 150 g N-methyl pyrrolidone by stirring under nitrogen for 4 h. This casting solution is allowed to cool to 25° C., filtered through a Seitz Supra 100 filter layer and subsequently degassed.

The casting solution is then knife-coated onto a glass plate to form a 100 μm thick film. The coated glass plate is then vertically introduced slowly into a precipitation bath containing H₂O at 25° C. as precipitant. After about 20 minutes, the membrane separates from the glass. It is then tested for ultrafiltration rate and dialytic permeability.

The results are as follows:
UF value: 126.9 [ml/h×m²×mm Hg]
Cl permeability: 8.04 [cm/s×10⁻⁴]

EXAMPLE 4

800 g of a high molecular weight polycarbonate based on bisphenol A[$\eta_{rel}$=1.8] were refluxed for 12 h with 32,000 g polyethylene glycol (MW 8000) in 12 kg chlorobenzene and 2.7 g of the disodium salt of bisphenol A.

Thereafter, a sample concentrated by evaporation had a relative viscosity $\eta_{rel}$ of 1.204.

6000 g of the above precondensate were introduced into a nitrogen-purged tank reactor and, after stirring, 480 g phosgene were introduced together with 49 l dichloremethane, 37 l water, 1650 g sodium hydroxide (45%) 5 g sodium borohydride. After the phosgene had been introduced, 8.4 ml N-hetyl piperidine was added as catalyst. After stirring for 1 h at 20° C., the mixture was acidified with diluted phosphoric acid and washed with distilled water until neutral. After removal of the solvent, a polycarbonate containing 80% by weight polyether ($\eta_{rel}$ 2.653) was obtained.

EXAMPLE 5

28.1 g of an aromatic polycondensate corresponding to the following formula

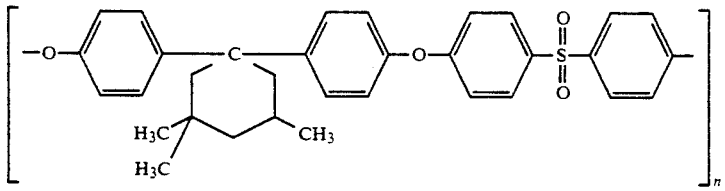

$\eta_{rel}$ 1.207, as measured on a 0.5% solution in CH₂Cl₂, and 9.4 g of the polycondensate described in Example 4 of 80% by weight polyglycol ether (Breox 8000) and 20% by weight bisphenol A polycarbonate are dissolved in 150 g N-methyl pyrrolidone by stirring for 4 h at 70° C. The solution is then left to cool to 25° C., filtered through a Seitz Supra 100 filter layer and subsequently degassed.

This casting solution is knife-coated onto a glass plate to form a 125 mm thick film. The coated glass plate is then slowly introduced vertically into a precipitation bath containing H₂O at 25° C. as precipitant. After about 15 minutes, the membrane separates from the glass. It is then tested for ultrafiltration rate and dialytic permeability.

The results are as follows:
UF value: 51.5 [ml/h×m²×mm Hg]
Cl permeability: 6.0 [cm/s×10⁻⁴]

EXAMPLE 6

Coating of a PC plate

The solution of the blend of Example 1 is concentrated by evaporation to dryness in a rotary evaporator. After drying in a vacuum drying cabinet at 70° C., 1.0 g solid is removed and dissolved in 99 g 1,3-dioxolane at 90° C. with addition of 0.2 g dodecyl benzenesulfonate. The clear solution is knife-coated by hand onto a polycarbonate plate and dried for 10 minutes at 70° C.

In-use Behavior

The coated plastic plate is immersed in water. After removal from the water, a thin film of water is spontaneously formed in contrast to an untreated plate. A few drops of water remain behind on the uncoated plate. The coating gives the plates a water-repellent surface.

We claim:
1. Blends of
a) 5% by weight to 95% by weight of a segmented aliphatic-aromatic polyether copolycarbonate corresponding to general formula (I)

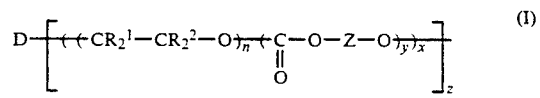

in which
R¹ and R² independently of one another represent H or C₁₋₅ alkyl or form a cycloaliphatic ring containing 5 to 6 ring members,
z=2 to 4,
n, x, y are selected so that the total molecular weight Mw is on average in the range from 10,000 to 350,000,
D is the deprotonated residue of a dihydric to tetrahydric C₂₋₁₈ alcohol optionally containing aromatic constituents, n is selected so that the molecular weight Mw (as determined by the light scattering method using a scattered light photometer of the optionally branched polyether block is in the range from 4,000 to 20,000, Z is a diphenol residue corresponding to general formula (II)

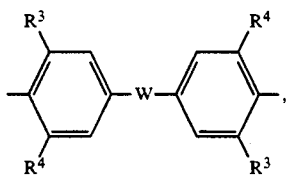
(II)

where
R³ and R⁴ independently of one another represent H, $C_{1-5}$ alkyl, O—$C_{1-5}$-alkyl or halogen,
W is a single chemical bond,

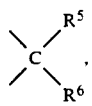

O, $SO_2$ or SO,
R⁵ and R⁶ independently of one another being hydrogen, $C_{1-18}$ alkyl, phenyl, $C_{7-19}$ alkaryl/aralkyl, in addition to which the substituents R⁵ and R⁶ may be closed to form a cycloalkyl group containing 4 to 18 ring members, or a group corresponding to the following formulae

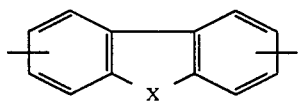
(IIa)

where
X=O, S, $SO_2$,

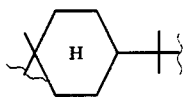
(IIb)

or

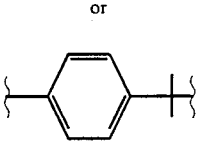
(IIc)

the polyether copolycarbonate (I) having a weight average molecular weight Mw in the range from 10,000 to 350,000 (as determined by the light scattering method using a scattered light photometer) and a content of 10% by weight to 75% by weight aromatic carbonate structural units

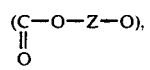

and
b) 95% by weight to 5% by weight of an aromatic polycarbonate or a mixture of aromatic polycarbonates, the total polyether content of the blends resulting from component a) being ≧18% by weight.

2. Blends as claimed in claim 1, characterized in that the blend partner of the polyether block copolycarbonate is an optionally branched polycarbonate based on bisphenol A or 1,1-bis-(4-hydroxyphenyl)-3,3,5-trimethylcyclohexane.

3. Blends as claimed in claims 1, characterized in that polyvinyl pyrrolidone or polyacrylic acids are incorporated.

4. A process for the production of the blends claimed in claim 1, characterized in that components a) and b) are mixed under moderate conditions in powder form, in the form of granules or in the form of solutions and the resulting mixture is isolated as a solid, optionally after evaporation of the solvent, crystallization, precipitation or spray evaporation or optionally via the melt.

5. Membranes produced from the mixtures claimed in claim 1.

* * * * *